United States Patent
Reitsma et al.

(10) Patent No.: US 9,946,859 B2
(45) Date of Patent: Apr. 17, 2018

(54) SYSTEMS AND METHODS FOR ENABLING A LOCK SCREEN OF AN ELECTRONIC DEVICE

(71) Applicant: MOTOROLA SOLUTIONS, INC., Schaumburg, IL (US)

(72) Inventors: Katrin Reitsma, Chicago, IL (US); Adam C. Lewis, Buffalo Grove, IL (US); Shanthi E. Thomas, Hoffman Estates, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 91 days.

(21) Appl. No.: 14/932,418

(22) Filed: Nov. 4, 2015

(65) Prior Publication Data
US 2017/0124307 A1    May 4, 2017

(51) Int. Cl.
*G06F 21/00* (2013.01)
*G06F 21/31* (2013.01)
(Continued)

(52) U.S. Cl.
CPC ............ *G06F 21/31* (2013.01); *G06F 3/0481* (2013.01); *G06F 3/0484* (2013.01); *G06F 21/30* (2013.01);
(Continued)

(58) Field of Classification Search
CPC ........ G06F 21/30; G06F 21/31; G06F 21/316; G06F 21/32; G06F 21/41; G06F 21/45
See application file for complete search history.

(56) References Cited

U.S. PATENT DOCUMENTS

| 6,691,232 B1 | 2/2004 | Wood et al. |
| 8,789,152 B2 | 7/2014 | Gnech et al. |

(Continued)

FOREIGN PATENT DOCUMENTS

CA    2802369    7/2013

OTHER PUBLICATIONS

PCT/US2016/055214 International Search Report and Written Opinion of the International Searching Authority dated Jan. 26, 2017 (10 pages).

*Primary Examiner* — Edward Zee
(74) *Attorney, Agent, or Firm* — Michael Best & Friedrich LLP

(57) ABSTRACT

A method of enabling a lock screen of an electronic device operating an electronic device that includes an electronic processor and a display screen. The method includes receiving, by the electronic processor, a request to unlock the electronic device. The method further includes determining, by the electronic processor, an authentication state for the electronic device. The method further includes, determining, by the electronic processor, a lock screen authentication mode based on the authentication state, and displaying, on the display screen, a lock screen including the lock screen authentication mode. The electronic device includes a display screen and an electronic processor. The electronic processor is configured to receive a request to unlock the electronic device. The electronic processor is further configured to determine an authentication state for the electronic device, determine a lock screen authentication mode based on the authentication state and display on the display screen, a lock screen including the lock screen authentication mode.

18 Claims, 4 Drawing Sheets

(51) Int. Cl.
*G06F 21/30* (2013.01)
*G06F 3/0481* (2013.01)
*G06F 3/0484* (2013.01)
*G06F 21/41* (2013.01)
*H04W 12/06* (2009.01)

(52) U.S. Cl.
CPC ............ *G06F 21/316* (2013.01); *G06F 21/41* (2013.01); *H04W 12/06* (2013.01)

(56) References Cited

U.S. PATENT DOCUMENTS

| | | |
|---|---|---|
| 2012/0084734 A1 | 4/2012 | Wilairat |
| 2013/0104187 A1* | 4/2013 | Weidner ................. G06F 21/31 726/1 |
| 2014/0187200 A1* | 7/2014 | Reitter ................. H04W 4/021 455/410 |

* cited by examiner

SYSTEMS AND METHODS FOR ENABLING A LOCK SCREEN OF AN ELECTRONIC DEVICE

BACKGROUND OF THE INVENTION

Electronic devices such as, for example, smart telephones, tablet computers, two-way radios, and other similar devices may include mechanisms that control access to various functions (for example, applications, wireless communications, and access to data networks). In some instances, a low-security credential (for example, a personal identification number stored locally on the device), must be entered before access to the electronic device is permitted. In other cases, sensitive applications running on the electronic device may require the entry of high-security credentials such as, for example, complex passwords or similar credentials, in addition to the personal identification number before access to the sensitive applications is permitted. High-security credentials may be managed by, and authenticated by, a remote authentication system.

As a consequence, users are often prompted for multiple user credentials when working with an electronic device, often in serial succession. For example, in some cases, re-entry of an expired high-security credential is required upon unlocking the electronic device, even when the device is not being unlocked to access sensitive applications. In another example, a secure container operating on an electronic device may have its own lock screen, requiring the entry of an additional high-security credential upon unlocking the electronic device. Performing multiple serial authentications increases "friction" for the user. User friction is basically anything which separates a device from an ideal user experience. That is, multiple authentications make the user's workflow longer and more complicated. The use of a single sign-on authentication mechanism is not sufficient to reduce user friction, due to the different levels of security of the various credentials.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
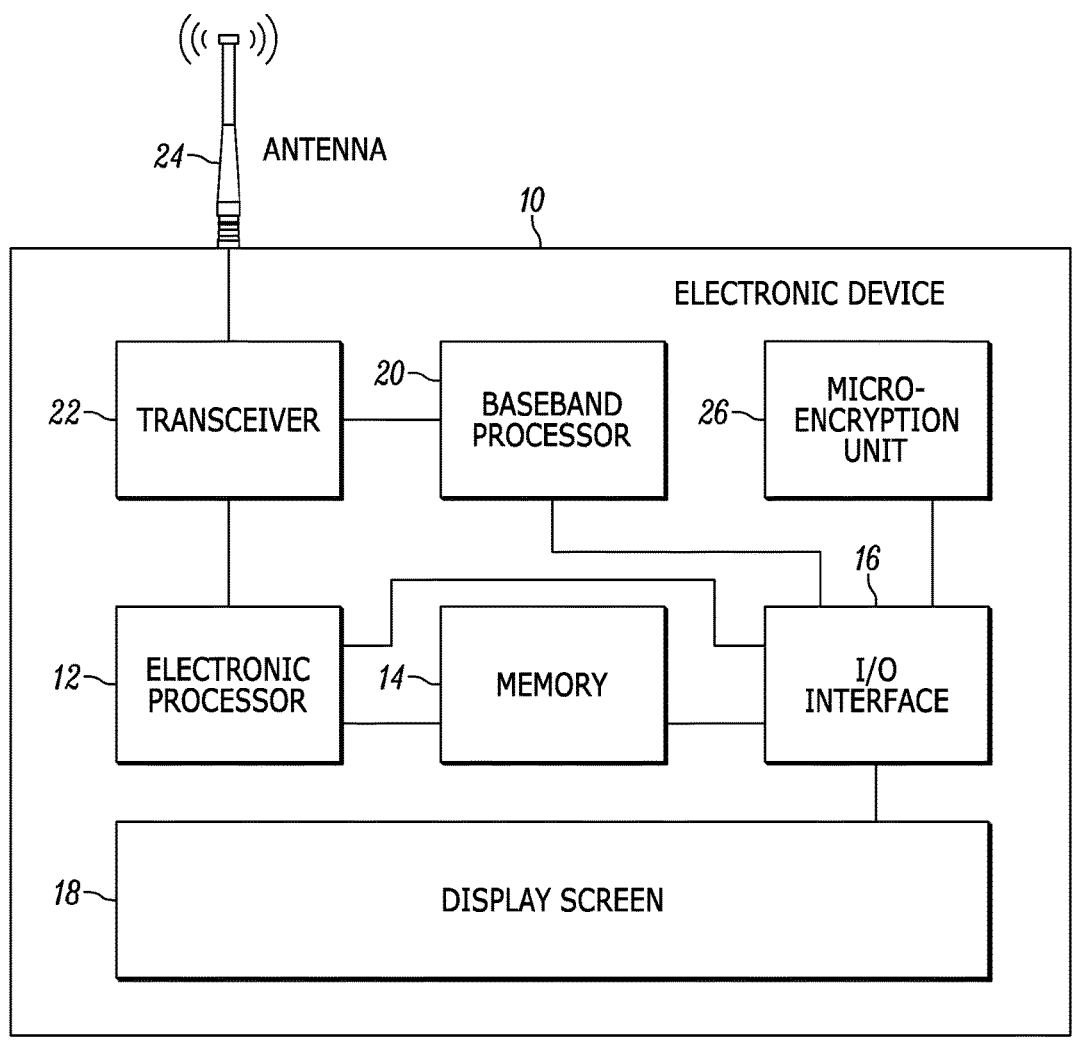
FIG. 1 is a block diagram of an electronic device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One exemplary embodiment provides a method of enabling a lock screen of an electronic device that includes an electronic processor and a display screen. The method includes receiving, by the electronic processor, a request to unlock the electronic device. The method further includes determining, by the electronic processor, an authentication state for the electronic device. The method further includes, determining, by the electronic processor, a lock screen authentication mode based on the authentication state, and displaying, on the display screen, a lock screen including the lock screen authentication mode.

Another exemplary embodiment provides an electronic device. The electronic device includes a display screen and an electronic processor. The electronic processor is configured to receive a request to unlock the electronic device. The electronic processor is further configured to determine an authentication state for the electronic device. The electronic processor is further configured to determine a lock screen authentication mode based on the authentication state and display on the display screen, a lock screen including the lock screen authentication mode.

FIG. 1 is a block diagram of an electronic device 10 according to one exemplary embodiment. In the example illustrated, the electronic device 10 includes an electronic processor 12 (e.g., a microprocessor or another suitable programmable device), a memory 14 (e.g., a non-transitory computer-readable storage medium), an input/output interface 16, a display screen 18, a baseband processor 20 (e.g., a network modem), a transceiver 22, an antenna 24, and micro-encryption unit 26. For ease of description, the embodiment of the electronic device 10 illustrated in FIG. 1 includes one of each component. Alternative embodiments may include one or more of each component, or may lack one or more components.

It should be noted that, in the description that follows, the terms "high-security" and "low-security" are used to distinguish, in a general way, between different authentication mechanisms, for example, a personal identification number (PIN) and a passphrase. The terms, however, are not meant to imply that any of the mechanisms or credentials so labeled is superior or inferior. Nor are the terms meant to imply that no other mechanisms could be considered "higher" or "lower" than the mechanisms so labeled. Nonetheless, "high-security" mechanisms provide a relatively higher authentication level relative to "low security" mechanisms. The converse is also true, "low-security" mechanisms provide a relatively lower authentication level relative to "high-security" mechanisms. As appreciated by one skilled in the art, a high-security authentication might also be referred to as a high-assurance authentication mechanism. Likewise, a low-security authentication might also be referred to as a low-assurance authentication mechanism.

In certain embodiments, the electronic device 10 may be a smart telephone. However, the systems and methods described herein are not limited to a smart telephone. In view of the description below, a person of ordinary skill in the art could implement embodiments of the invention in many different types of electronic devices such as, for example, a cellular telephone, a smart watch, a tablet computer, a personal digital assistant (PDA), a two-way radio, or any other electronic device, or a combination of the foregoing.

The electronic processor 12, the memory 14, the input/output interface 16, the baseband processor 20, the transceiver 22, the antenna 24, and the micro-encryption unit 26, as well as other various modules and components, are connected to each other by or through one or more control or data buses, which enable communication therebetween. The memory 14 may include a program storage area (e.g., read only memory (ROM) and a data storage area (e.g., random access memory (RAM), and another non-transitory computer readable medium. The electronic processor 12 is coupled to the memory 14 and executes computer readable instructions ("software") stored in the memory 14. For example, software for performing the methods described herein may be stored in the memory 14. The software may include one or more applications, program data, filters, rules, one or more program modules, and/or other executable instructions.

The input/output interface 16 operates to receive user input, to provide system output, or a combination of both. User input may be provided via, for example, a keypad, a microphone, soft keys, icons, or soft buttons on the display screen 18, a scroll ball, buttons, and the like. System output may be provided via the display screen 18. The display screen 18 is a suitable display device such as, for example, a liquid crystal display (LCD) touch screen, or an organic light-emitting diode (OLED) touch screen. The input/output interface 16 may include a graphical user interface (GUI) (e.g., generated by the electronic processor 12, from instructions and data stored in the memory 14, and presented on the display screen 18) that enables a user to interact with the electronic device 10. In some embodiments, the input/output interface 16 includes a push-to-talk (PTT) button for activating a two-way radio modem (not shown), which button may implemented, for example, as a physical switch or by using a soft key or icon in the graphical user interface on the display screen 18.

The baseband processor 20 is configured to encode and decode digital data sent and received by the transceiver 22. The transceiver sends and receives data to and from various wireless communications and data networks via the antenna 24.

The micro-encryption unit 26 is an electronic component that performs security functions for the electronic device 10, such as, for example, key management, data encryption, and random number generation using hardware, software, or a combination of both. In some embodiments, the micro-encryption unit 26 is a Motorola CRYPTR™ Micro Encryption Unit.

In one exemplary embodiment, the electronic device 10 is configured to perform a variety of functions, accessible via components including the input/output interface 16 and the display screen 18. The functions include, for example, running local or network-based applications ("apps"), providing access to remote data networks (for example, using the long-term evolution (LTE) protocol), and providing wireless voice communications using one or more modalities (for example, land mobile or cellular). The electronic device 10 is configured to prevent unauthorized access to its functions by requiring user credentials including, for example, personal identification numbers, passphrases, and the like.

Some functions of the electronic device 10 are considered sensitive. For example, some sensitive applications may allow the user of the application to access confidential information, influence public safety responses, or otherwise perform functions that are ordinarily restricted to authorized persons. In some embodiments, the electronic device 10 is configured to use encryption keys and applications stored on the micro-encryption unit 26 to, for example, send and receive encrypted communications over one or more wireless networks. Accordingly, access to the micro-encryption unit 26 is a sensitive function, secured with a high-security user credential. Sensitive functions are secured from unauthorized access using high-security user credentials including, for example, "strong" passwords or two-factor authentication. Strong passwords are complex (that is, containing combinations of letters, numbers, or symbols) and must meet minimum length requirements. Two-factor authentication requires two of the following types of authentication credentials: "something you know" (for example, a password), "something you have" (for example, a physical token), and "something you are" (for example, a fingerprint or other biometric). Accordingly, high-security credentials, while providing a higher level of security, are often not user-friendly, especially to mobile users.

In an exemplary embodiment, the electronic device 10 is configured to implement a single sign-on authentication mechanism to protect access to some of its sensitive functions. Single sign-on (SSO) allows access to more than one sensitive function, for example, several applications, through the entry of the same SSO authentication credential(s), rather than having to enter different authentication credentials for each function being accessed. Single sign-on requires the electronic device 10 to communicate with an identity server (not shown) via one or more wired or wireless data networks. After successful authentication using single sign-on, the electronic device 10 receives a single sign-on token from the identity server (for example, a single sign-on server). In some embodiments, the single sign-on token expires after a predetermined time, after which the electronic device 10 must re-authenticate and receive a new single sign-on token in order to continue accessing the functions secured via the single sign-on authentication mechanism. While a single sign-on token remains unexpired, it is valid. Likewise, an expired single sign-on token is invalid.

In another exemplary embodiment, the electronic device 10 is configured with a secure container to access data and applications securely on the electronic device 10 or in a remote environment, such as, for example, a corporate or government data network. A secure container is, for example, an authenticated, encrypted area of a device that can be used to insulate sensitive corporate information from the personal side. The secure container allows a user of the electronic device 10 to access the secured data, applications, or remote environment, but does not allow other functions or applications on the electronic device 10 to access data, applications or other functions inside the secure container or the remote environment. An application, stored data or function, when contained within a secure container, is considered sensitive and protected because it is within the secure container. User access to a secure container is typically protected with a high-security user credential, which can be verified locally on the electronic device 10. A locally-verified credential is typically different than a single sign-on credential that is managed by, and verified by, a remote identity server. Once authenticated, a secure container security session allows a user access to the functions protected by the secure container. The secure container security session may expire after a predetermined period of inactivity.

Other functions of the electronic device 10 are considered less sensitive, and are secured from unauthorized access using low-security user credentials including, for example, a personal identification number (PIN). Less sensitive functions include, for example, non-sensitive applications, voicemail retrieval, voice telephone call initiation, and unlocking the device. Non-sensitive applications do not provide access to functions or networks that are otherwise restricted to unauthorized persons (for example, internet browsers and GPS navigation software). As noted above, otherwise non-sensitive functions, when contained within a secure container, are considered sensitive.

Some functions might otherwise be considered sensitive, for example, communicating on a public safety land mobile radio network with a push-to-talk (PTT) button. However, those functions are also mission-critical, and therefore quick access to those functions, may, in some cases, override security concerns. For example, a police officer should not have to enter a complex passcode in order to make radio calls on the police network. In some embodiments, such mission-critical functions may be protected with only a low-security user credential, or may be accessible without entering user credentials.

The electronic device 10 is further configured to lock itself (that is, to prohibit access to many or all of its functions until it is unlocked). The electronic device 10 may lock itself after a predetermined idle timeout (that is, a period of inactivity), after receiving a user-generated lock command, after receiving an administrative lock command via a wireless network, or some combination of the foregoing. Once locked, many of the functions of the electronic device 10 are inaccessible. When a request is received to unlock the electronic device 10, for example, from the input/output interface 16, the electronic device 10 will display a lock screen on the display screen 18. A lock screen is a screen that is configured to prompt for and receive user credentials. Full functionality of the electronic device 10 is restored when it is unlocked by, for example, receiving a user credential via a lock screen of the graphical user interface.

When the electronic device 10 is unlocked, it displays a home screen on the display screen 18. As used herein, the term "home screen," does not denote one particular screen or type of screen. Rather, a "home screen" is the screen to be displayed when the device is unlocked. In one example, the home screen may be a screen displayed by the operating system of the electronic device 10 that allows a user to choose from a number of applications and functions. In another example, the home screen is the last-used operational screen of the application that was running when the electronic device 10 was locked. A home screen may also be a secure container function, application, or home screen, if the electronic device 10 was operating in the secure container when it was locked. In some embodiments, the home screen is not the last-used screen, but is automatically determined by a context-aware application. For example, in a public safety environment, the home screen may be an automated dispatch screen when an automated dispatch system sends a task to the electronic device 10. Similar to the functions of the electronic device 10, home screens may be classified as sensitive and non-sensitive. A sensitive home screen may be, for example an operational screen of a public safety automated dispatch system, a secure email application, or any application running within a secure container. A non-sensitive home screen may be, for example, an operating system screen with default applications such as browsers, document editors, platform tools, and developer tools included with the operating system.

Figure 3:
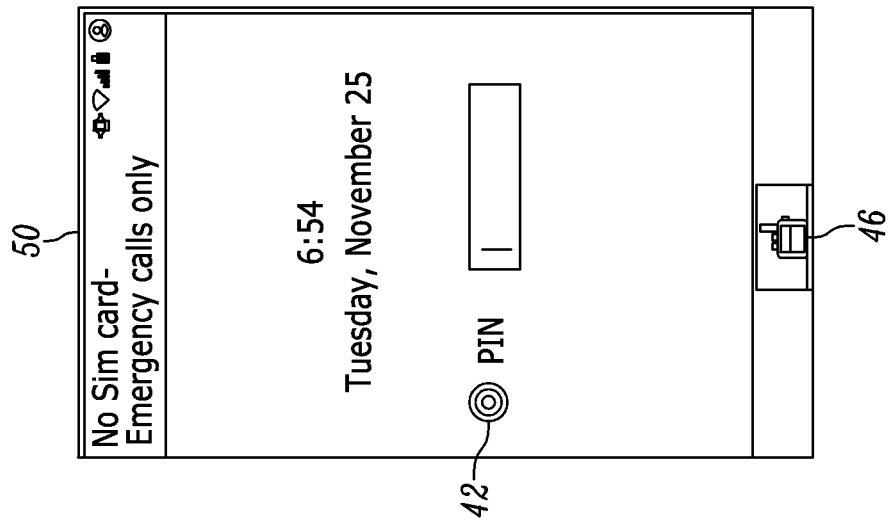
FIG. 2 and FIG. 3 illustrate graphical displays in accordance with some embodiments.
Figure 2:
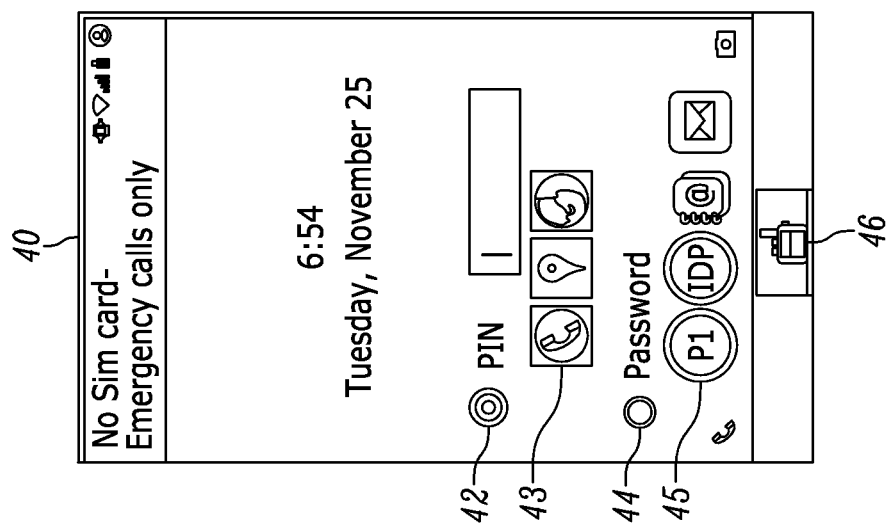

FIG. 2 and FIG. 3 illustrate exemplary embodiments of intelligent lock screens. FIG. 2 illustrates an exemplary embodiment of a mixed-security lock screen 40 (that is, it offers both high and low-security authentication options). The mixed-security lock screen 40 includes a low-security authentication mode 42, low-security icons 43, a high-security authentication mode 44, high-security icons 45, and a push-to-talk soft button 46. The low-security authentication mode 42 is a lock screen authentication mode that accepts the entry of a low-security user credential (for example, as illustrated, a personal identification number (PIN)). The low-security icons 43 indicate which applications or functions are available after authentication using the low-security authentication mode 42. The high-security authentication mode 44 is a lock screen authentication mode that accepts the entry of a high-security user credential (for example, as illustrated, a password). The high-security icons 45 indicated which applications or functions are available after authentication using the high-security authentication mode 44. Alternative embodiments may not include the low-security icons 43 or the high-security icons 45. The push-to-talk soft button 46 is a software-implemented land mobile radio push to talk button. In some embodiments, the push-to-talk soft button 46 function is enabled without entering a user credential. The electronic device 10 is configured to display the mixed-security lock screen 40 on the display screen 18, and to receive a user-selected authentication mode. The electronic device 10 is also configured to display the mixed-security lock screen 40 with a pre-selected lock screen authentication mode. As explained in detail below, the pre-selected lock screen authentication mode is based on, for example, what function a user of the electronic device 10 was using when the electronic device 10 was locked and what function a user of the electronic device 10 may need upon unlocking. In the illustrated embodiment, shown in FIG. 2, the pre-selection is indicated with "radio button" graphical user interface elements. In alternative embodiments, pre-selection could be indicated with a check box element, highlighting, magnification, "graying out" the authentication mode that is not selected, and the like.

FIG. 3 illustrates an exemplary embodiment of a low-security lock screen 50. The electronic device 10 is configured to display the low-security lock screen 50 on the display screen 18, and to receive a low-security user credential. The low-security lock screen 50 includes a low-security authentication mode 42, and a push-to-talk soft button 46 that operate similarly to the mixed-security lock screen 40.

Figure 4A:
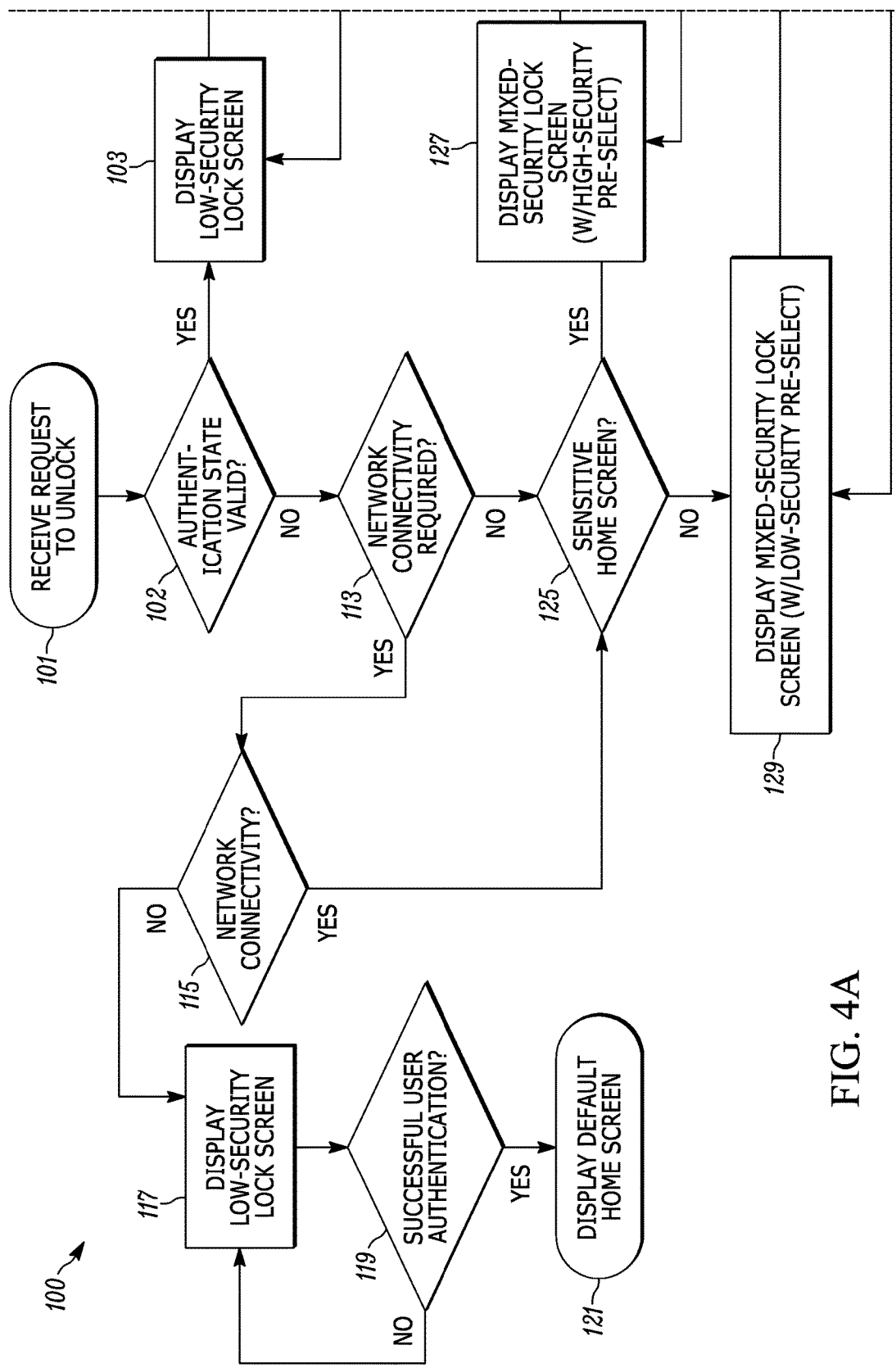
FIGS. 4A and 4B illustrate a flowchart of a method of controlling the electronic device accordance with some embodiments.
Figure 4B:
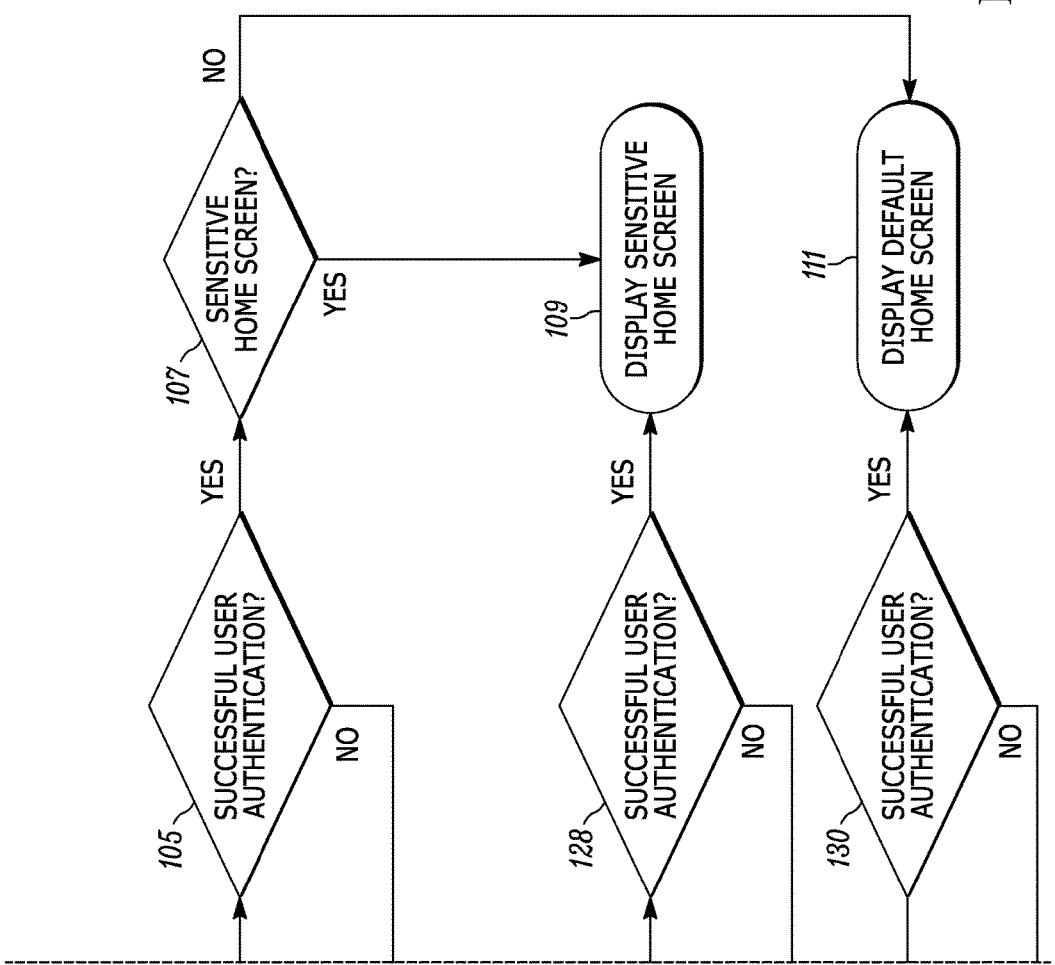

FIGS. 4A and 4B illustrate an exemplary method 100 for enabling lock screens on the electronic device 10. As noted above, the electronic device 10 may be locked. In one embodiment, the display screen 18 displays nothing while the electronic device is locked. At block 101, the electronic device 10 receives a request to unlock itself. The request may be received, for example, via the input/output interface 16. The remainder of the method 100 is directed to determining what lock screen (for example, mixed-security or low-security) to display in response to the received request.

Some aspects of the method 100 described below are directed to handling unsuccessful authentications (for example, failed attempts to unlock the electronic device 10). It should be noted that, for ease of description, the potential consequences of multiple unsuccessful authentications are not described below. However, in some embodiments, the electronic device 10 will take an action to secure itself after a predetermined number of unsuccessful authentication attempts (which it may interpret as an attempt to gain unauthorized access). For example, the electronic device 10 may lock itself for an extended time period (for example, 10 minutes), perform a factory reset (that is, erase all configuration data, added applications, and user data), erase certain data (for example, sensitive data) from itself, send a warning to a remote cybersecurity analytics server, or render itself inoperative (for example, by "bricking" itself).

At block 102, the electronic device 10 determines an authentication state. Determining an authentication state includes determining, for example, a valid single sign-on token is present or a valid secure container security session exists. When a valid authentication state exists (for example, a valid single sign-on token is present or a valid secure container security session exists), the electronic device 10 may allow access to both sensitive and non-sensitive functions after entry of only a low-security user credential. This reduces user friction upon unlocking of the electronic device 10. Accordingly, when a valid authentication state exists, the electronic device 10 displays the low-security lock screen 50, which includes only the low-security authentication mode 42, at block 103. At block 105, the electronic device 10 receives a low-security user credential. When the user authentication is unsuccessful, the electronic device 10 continues to display the low-security lock screen 50 on the display screen 18, at block 103.

When the electronic device 10 receives a successful user authentication, the electronic device 10 determines the electronic device 10 determines the home screen state, at block 107. The home screen state tracks the last home screen that was active before the electronic device 10 was locked. However, the home screen state is updated when, as noted above, a context-sensitive application designates a home screen that was active when the electronic device 10 was locked. The home screen state also includes information regarding, for example, whether the last active home screen before the electronic device 10 locked is sensitive or non-sensitive, or whether the electronic mobile device 10 was operating in a secure container when it was locked. The electronic processor 12 determines the home screen state by, for example, retrieving state information from the memory 14. When the home screen state is sensitive, the electronic device 10 displays the sensitive home screen on the display screen 18, at block 109. When the home screen state is non-sensitive, the electronic device 10 displays the default home screen (for example, the operating system home screen or other non-sensitive home screen) on the display screen 18, at block 111.

Returning now to block 102, when the authentication state is not valid, access to sensitive functions is unavailable without re-authentication. Because re-authentication may depend on network connectivity, the electronic device 10 determines whether a network connectivity requirement, at block 113. Whether network connectivity is required depends on the type of authentication mechanism being used to secure sensitive functions. For example, network connectivity is required for single sign-on authentication because it requires the electronic device 10 to authenticate to a remote identity server. In another example, network connectivity is not required for secure container authentication, because the authentication occurs locally on the electronic device 10.

When network connectivity is required, the electronic device 10 determines a network connectivity state, at block 115. The network connectivity state depends on whether the electronic device 10 has an identity server connection (that is, network connectivity to, for example, a single sign-on server). In one example, the network connectivity state is determined based on whether a single sign-on client has an existing connection with the single sign-on server. In another example, the network connectivity state is determined by the single sign-on client attempting to establish a connection with the single sign-on server.

Without network connectivity, a remotely-authenticated user credential (for example, single sign-on) cannot be used for authentication. Accordingly, when a network connection is required, but is not, or cannot be, successfully established, the electronic device 10 displays the low-security lock screen 50, which includes only the low-security authentication mode 42, at block 117. At block 119, the electronic device 10 receives a low-security user credential. When the user authentication is unsuccessful (that is, the low-security user credential is invalid), the electronic device 10 continues to display the low-security lock screen 50 on the display screen 18, at block 117. When the electronic device 10 receives a successful user authentication (that is, the low-security user credential is valid), only non-sensitive functions are available, and the electronic device 10 therefore displays the default home screen on the display screen 18, at block 121.

When the authentication state is invalid, sensitive functions are not immediately available, but may be available after successful authentication. In one example (at block 113), the authentication state is not valid, and network connectivity is not required (for example, because secure container authentication is being used). In another example (at block 115), the authentication state is not valid, and network connectivity is both required and present. In both examples, the electronic device 10 displays the mixed-security lock screen 40, presenting a user with a choice between the low-security authentication mode 42 and the high-security authentication mode 44, as explained below (at blocks 125 through 129).

At block 125, the electronic device 10 determines whether the home screen state is sensitive or non-sensitive. When the home screen state is sensitive, the electronic device 10 displays the mixed-security lock screen 40 on the display screen 18, at block 127. Because the home screen state is sensitive, and therefore requires a high-security credential for access, the electronic device 10 displays the mixed-security lock screen 40 with the high-security authentication mode 44 pre-selected. In some embodiments, the pre-selected lock screen authentication mode can be overridden by a user making an authentication mode selection. At block 128, the electronic device 10 receives an authentication mode selection and a user credential matching the authentication mode selection. For example, when the pre-selected lock screen authentication mode is used, the electronic device 10 receives a high-security authentication mode selection and user credential. When the user authentication is unsuccessful, the electronic device 10 continues to display the mixed-security lock screen 40 on the display screen 18, at block 127. When the electronic device 10 receives a successful user authentication (for example, by receiving a valid single sign-on token or a valid secure container credential), the electronic device 10 displays the sensitive home screen, at block 109. Entry of a low-security user credential to unlock the electronic device 10 would be superfluous, because a successful authentication was already received using a high-level security user credential. Accordingly, a low-security user credential is not required or prompted for after the higher-security user credential is provided, thus reducing user friction upon unlocking of the electronic device 10.

In another example, the pre-selected lock screen authentication mode (high-security) is not chosen by the user, though the home screen state was determined as sensitive by the device, and the electronic device 10 receives a low-security authentication mode selection and user credential at block 128. In such case, successful authentication using the low-security user credential would result in the electronic device 10 unlocking to the default home screen, rather than a the sensitive home screen.

Returning to block 125, when the home screen state is non-sensitive the electronic device 10 displays the mixed-security lock screen 40 on the display screen 18, at block 129. Because the home screen state is non-sensitive, and therefore does not requires a high-security credential for access, the electronic device 10 displays the mixed-security lock screen 40 with the low-security authentication mode 42 pre-selected. At block 130, the electronic device 10 receives an authentication mode selection and a user credential matching the authentication mode selection. For example, when the pre-selected lock screen authentication mode is used, a low-security authentication mode selection and user credential is received. When the user authentication is unsuccessful, the electronic device 10 continues to display the mixed-security lock screen 40 on the display screen 18, at block 129. When the electronic device 10 receives a successful user authentication, the electronic device 10 displays the default home screen, at block 111.

Although the authentication state is not valid, entry of a high-security user credential is not required to unlock the electronic device 10 because access to a sensitive function has not been requested (that is, the home screen is non-sensitive). This reduces user friction when unlocking the electronic device 10 to access only non-sensitive functions.

In another example, pre-selected lock screen authentication mode (low-security) is not chosen by the user, though the home screen state was determined as sensitive by the device, and the electronic device 10 receives a high-security authentication mode selection and user credential at block 130. In such case, successful authentication using the high-security user credential would result in the electronic device 10 unlocking to the sensitive home screen, rather than a the default home screen.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of enabling a lock screen of an electronic device that includes an electronic processor and a display screen, the method comprising:
   receiving, by the electronic processor, a request to unlock the electronic device;
   determining, by the electronic processor, an authentication state for the electronic device, the authentication state indicative of the electronic device having received a user credential;
   determining, by the electronic processor, a home screen state, the home screen state being one of a group consisting of a sensitive home screen state and a non-sensitive home screen state;
   determining, by the electronic processor, a lock screen authentication mode based on the authentication state and the home screen state;
   determining, by the electronic processor, a pre-selected lock screen authentication mode based on the home screen state;
   displaying, on the display screen, the lock screen including the lock screen authentication mode and the pre-selected lock screen authentication mode;
   upon receiving a successful user authentication, determining, by the electronic processor, a function of the electronic device that can be accessed based on the successful user authentication; and
   displaying, on the display screen, a home screen providing access to the function.

2. The method of claim 1, wherein determining the lock screen authentication mode includes
   when the authentication state is not valid, determining a relatively lower authentication level relative to when the authentication state is valid, and
   when the authentication state is valid, determining a relatively higher authentication level relative to when the authentication state is not valid.

3. The method of claim 2, further comprising:
   upon receiving a successful user authentication,
   displaying, on the display screen, one of a group consisting of a sensitive home screen and a non-sensitive home screen, based on the authentication state and the home screen state.

4. The method of claim 2, further comprising:
   determining, by the electronic processor, a network connectivity requirement for the electronic device; and
   determining, by the electronic processor, a network connectivity state for the electronic device.

5. The method of claim 4, wherein determining the network connectivity state for the electronic device includes
   determining, by the electronic processor, whether an identity server connection exists.

6. The method of claim 4, further comprising:
   upon receiving a successful user authentication, displaying, on the display screen, a home screen based on the network connectivity requirement, the network connectivity state, and the authentication state;
   wherein determining the lock screen authentication mode is further based on the network connectivity requirement and the network connectivity state.

7. The method of claim 1, further comprising:
   receiving, by the electronic processor, an authentication mode selection; and
   upon receiving a successful user authentication, displaying, on the display screen, a home screen based on the authentication mode selection.

8. The method of claim 7, wherein receiving the successful user authentication includes receiving a valid single sign-on token.

9. The method of claim 7, wherein receiving the successful user authentication includes receiving a valid secure container credential.

10. An electronic device, the electronic device comprising:
    a display screen; and
    an electronic processor configured to
    receive a request to unlock the electronic device;
    determine an authentication state for the electronic device, the authentication state indicative of the electronic device having received a user credential;
    determine a home screen state, the home screen state being one of a group consisting of a sensitive home screen state and a non-sensitive home screen state;
    determine a lock screen authentication mode based on the authentication state and the home screen state;
    determine a pre-selected lock screen authentication mode based on the home screen state;
    display on the display screen, a lock screen including the lock screen authentication mode and the pre-selected lock screen authentication mode;
    upon receiving a successful user authentication, determine, by the electronic processor, a function of the electronic device that can be accessed based on the successful user authentication; and
    display, on the display screen, a home screen providing access to the function.

11. The electronic device of claim 10, wherein the electronic processor is further configured to
    when the authentication state is not valid, determine a lock screen authentication mode including a relatively lower authentication level relative to when the authentication state is valid, and
    when the authentication state is valid, determine a lock screen authentication mode including a relatively higher authentication level relative to when the authentication state is not valid.

12. The electronic device of claim 11, wherein the electronic processor is further configured to
    upon receiving a successful user authentication,
    display, on the display screen, one of a group consisting of a sensitive home screen and a non-sensitive home screen, based on the authentication state and the home screen state.

13. The electronic device of claim 11, wherein the electronic processor is further configured to
    determine a network connectivity requirement for the electronic device; and
    determine a network connectivity state for the electronic device.

14. The electronic device of claim 13, wherein the electronic processor is further configured to
    determine whether an identity server connection exists;
    wherein the network connectivity state is based on whether the identity server connection exists.

15. The electronic device of claim 13, wherein the electronic processor is further configured to
    upon receiving a successful user authentication, display, on the display screen, a home screen based on the network connectivity requirement, the network connectivity state, and the authentication state;

wherein the lock screen authentication mode is further based on the network connectivity requirement and the network connectivity state.

16. The electronic device of claim 10, wherein the electronic processor is further configured to
   receive an authentication mode selection; and
   upon receiving a successful user authentication, display, on the display screen, a home screen based on the authentication mode selection.

17. The electronic device of claim 16, wherein the successful user authentication is a valid single sign-on token.

18. The electronic device of claim 16, wherein the successful user authentication is a valid secure container credential.

* * * * *